United States Patent Office 2,796,418
Patented June 18, 1957

2,796,418

ACID MILLING OF VATTABLE ORGANIC COMPOUNDS

Robert E. Brouillard, Westfield, and Thomas D. Mutaffis, North Plainfield, N. J., and Marvin O. Shrader, Pittsburgh, Pa., assignors to General Aniline & Film Corporation, New York, N. Y., a corporation of Delaware No Drawing. Application April 29, 1953,
Serial No. 352,022

11 Claims. (Cl. 260—263)

The present invention relates to a process for conditioning water-insoluble vattable organic compounds, and more particularly, to an acid pasting procedure applied to such compounds which provides products whose particle size, particle size distribution, and particle surface characteristics render them exceedingly suitable for textile and other applications, as for example, dyeing, printing, padding, coloring of masses, and the like.

Water insoluble vattable organic dyestuffs are generally obtained as large coarse crystals or highly agglomerated amorphous masses. If these be applied without modification they possess very poor application properties and tinctorial values. It is therefore necessary in order to develop fully the coloristic potential and working properties of the dyestuffs, to so modify their nature that the particle characteristics are rigidly controlled.

Various methods have been developed for the conditioning of water insoluble vattable organic dyestuffs. The most important of these is that known as acid pasting. Such acid pasting may be accomplished by two general methods. The first method involves solution of the dyestuff in concentrated acid followed by precipitation of the dyestuff by drowning the acid solution into water. The second method involves slurrying the dyestuff in a large volume of acid having a concentration insufficient to effect appreciable solution, followed by diluting with water.

These two processes, although applicable to most water insoluble vattable organic dyestuffs suffer from disadvantages in that they require large quantities of acids which are generally of an extremely corrosive nature. In addition to this unfavorable economic and operational factor, the use of such volumes of acids requires correspondingly larger pieces of equipment and poses problems in industrial hygiene and safety, as well as an extremely serious and costly disposal problem.

Further factors militating against the adoption of such procedures are that the quality of the products obtained varies from run to run and is often unsatisfactory for particular applications, and that the concentration of dyestuffs in the final presscake is low. Low presscake concentrations are disadvantageous in that they result in lower capacities, greater handling costs, and involve troublesome operations such as distillation or hydraulic pressing before marketable products can be obtained.

The above disadvantages have long been recognized and proposals have been made to overcome them by modifying the conventional acid pasting procedures. To this end it is suggested in United States Letters Patent No. 2,334,812 to drown the acid solution of the dyestuff in water under conditions described as "turbulent flow." On the other hand, United States Letters Patent No. 2,176,011 teaches the spraying of the acid solution into water.

While these modifications have led to improvements in specific properties, these improvements have been accompanied by degradation in other properties. More important still is the fact that these modifications have failed to obviate the basic economic, quality, and handling problems inherent in the previous acid pasting procedures.

Suggestions have also been made with regard to the use of conditioning methods which avoid acid pasting. One such suggestion comprises the solution of a vattable dyestuff as the leuco compound and precipitation by oxidation. Another suggestion in United States Letters Patent No. 2,402,167 describes the creation of small particles by grinding under suitable conditions. These procedures have serious operational disadvantages and involve high manufacturing costs. When this factor is added to the fact that the dyestuffs conditioned in this way show no advantage over those obtained by acid pasting, it is manifest that these conditioning methods have not met with full acceptance by the trade.

In copending application Serial No. 236,695, filed July 13, 1951, by R. E. Brouillard, there is disclosed and claimed a process for conditioning dipyrazolanthrones comprising milling with shearing forces a mixture comprising a dipyrazolanthrone in an amount of a strong normally liquid non-oxidizing acid sufficient to produce a thick magma, and drowning the resulting magma in water. That process may also be applied to certain other water insoluble vattable organic compounds enabling the attainment of highly desirable results. It eliminates the disadvantages attributable to the prior methods of acid pasting which required large amounts of acid. The process also greatly shortens the milling time, produces a presscake with a relatively high solids content, and is applicable to compounds which are unstable to conventional acid pasting due to their solubility in the acid.

While the process of said copending application is satisfactory in most instances, the products produced thereby sometimes do not have the transparency properties required for certain purposes such as in the production of multicolor and iridescent effects. It would also be highly desirable to improve the operational and economic characteristics of said process by a still further reduction in the amount of acid required therein.

It is an object of this invention to provide a process which will have all of the advantages attributable to the manipulative process of said copending application, which will require lower amounts of acid, and which will produce water insoluble vattable organic compounds in particulate form having improved properties. Other objects and advantages will appear as the description proceeds.

The above objects are attained by the instant invention which is directed to a process comprising milling with forces predominantly shearing in nature, a mixture comprising a water insoluble vattable organic compound, an acid stable, water soluble inorganic salt and a quantity of a strong normally liquid non-oxidizing acid sufficient to produce with said compound and salt a doughy kneadable mass, and drowning the resulting milled mixture in water. The aqueous mixture is then filtered and washed acid free.

The procedure of this invention is suitable for the conditioning of any water insoluble vattable organic compound. Illustratively the process is applicable to the treatment of anthraquinones, and dyestuffs of the indigoid and quinonoid type including, for example, acylamino anthraquinones, anthanthrones, anthraquinone acridines and acridones, anthraquinone azines, anthraquinone oxazoles, anthraquinone thiazoles, benzanthrones, carbazoles of the anthraquinone series, dipyrazolanthrones, heterocyclic imides and imidazoles, indigos, flavanthrones, pyranthrones, pyrene quinones, thionaphthenes, thioxanthrones, and the like. Obviously the compounds may contain inert substituents which do not prevent the attainment of the desired results herein.

The acid-stable water-soluble salts employed in the process of this invention are in general alkali metal sulfates and phosphates, as for example, sodium and potassium sulfates, acid sulfates, phosphates, acid phosphates, and the like. The amount of salt required for optimum performance should be at least one-half part by weight per part of pigment. Generally, no more than five parts by weight of salt per part of pigment is required since larger amounts require higher acid consumption and thus interfere with the basic economic advantages of the instant process.

Operative strong, non-oxidizing, normally liquid acids for the purpose of the instant process are sulfuric, phosphoric, chlorosulfonic, chloroacetic and lower alkyl sulfonic acids such as methyl sulfonic, ethyl sulfonic and the like. The greatest economy and best results are obtained with sulfuric acid and the use of this acid is therefore preferred.

One of the essential features of this process is the quantity of acid employed. Such quantity should be that necessary to produce with the compound and salt a doughy kneadable mass. The particular quantity of acid which will give this result can be readily determined by experimentation. Thus, if the quantity is too small, the pigment does not wet out completely. Too great a quantity of acid, on the other hand, does not allow adequate shearing, and leads to lumpy masses in which the acid does not contact all the particles of the compound, in addition to requiring larger quantities of salt. In general, the quantity of acid will be within the range of about 0.5 to 2 parts by weight per part of compound. It is possible to vary the compound-salt-acid ratio after the mass has been milled under shearing in order to improve the ease with which the mixture may be discharged from the mill. Observation of the aforestated condition, however, is necessary when the shearing action is originated in order to obtain the desired results.

The concentration of the acid will of course depend somewhat upon the particular acid employed and the particular compounds treated and the like. Generally speaking, however, the concentration will range from about 68 to 100 percent. Simple tests will be sufficient to indicate the specific concentration within this range which will give optimum results in any particular instance.

The particular apparatus used for effecting the milling of the compound-salt-acid mass must be one capable of exerting a substantially uniform shearing action throughout the mass. Any apparatus capable of so operating is suitable. We prefer to use a Werner-Pfleiderer type of mill, but Banbury mixers or other mills may be employed which operate by other mechanisms such as by extrusion, provided that they operate to exert a uniform shearing force on the composition being milled.

The temperature at which the process is carried out is not critical and may in fact vary between the melting point and the boiling point of the composition being milled, as for example, between about 0 to 150° C. There is a definite relationship between the temperature employed and the acid concentration required to give optimum results with a particular compound. Higher temperatures generally require lower acid concentrations. For practical reasons, we prefer to operate in the temperature range of about 20 to 50° C. since unjacketed equipment may thus be employed. The milling time under shear is also dependent on other factors and may range from as little as about 5 minutes to as much as 5 hours or more, the shorter periods being obviously preferred where possible.

The following examples, in which parts are by weight unless otherwise indicated, are illustrative of the instant invention and are not to be regarded as limitative.

*Example 1*

100 parts of Algol Pink R (C. I. 1128), 100 parts of 85% sulfuric acid and 200 parts of sodium sulfate were introduced into a Werner-Pfleiderer mill and milled for one hour. The magma was discharged into 1000 parts of water with agitation. The slurry which resulted was filtered and the cake washed acid-free.

The dyestuff obtained showed excellent application properties.

*Example II*

100 parts of dichloroanthanthrone, 75 parts of 100% sulfuric acid and 150 parts of sodium sulfate were introduced into a Werner-Pfleiderer mill and milled for 2 hours. The magma was discharged into 1000 parts of water under agitation. The slurry which resulted was filtered and the cake washed acid-free.

The dyestuff obtained had excellent application properties.

Similar results were obtained when an equivalent amount of each of the following dyestuffs was substituted for the Algol Pink R: 1,2-benzo-5,6-phthaloylacridone, Indanthrene Blue RD (C. I. 1106) and 1-amino-2-anthraquinonyl-2',3' anthraquinone oxazole.

*Example III*

100 parts of 1,2,5,6-anthraquinone-C-diphenyl dithiazole, 100 parts of 96% sulfuric acid and 175 parts of sodium sulfate were introduced into a Werner-Pfleiderer mill and milled for one hour. The magma was discharged into 1000 parts of water with agitation. The slurry which resulted was filtered and the cake washed acid-free.

The dyestuff obtained had excellent application properties.

Similar results were obtained when an equivalent amount of each of the following dyestuffs was substituted for the anthraquinone diphenyldithiazole: Indanthrene Dark Blue BO (C. I. 1099), Indanthrene Brilliant Green B (C. I. 1101), N,N'-diethyl dipyrazolanthrone, flavanthrone, perylene-3,4,9,10-tetracarboxylic acid-bis-p-anisside, pyranthrone and 4,4'-dimethyl-6,6'-dichlorothioindigo.

Various modifications and variations of this invention will be obvious to a person skilled in the art and it is to be understood that such modifications and variations are to be included within the purview of this application and the spirit and scope of the appended claims.

We claim:

1. A process comprising milling with forces predominantly shearing in nature a mixture in the form of a doughy kneadable mass consisting essentially of a water-insoluble vattable organic compound selected from the group consisting of vat dyestuffs of the indigoid and quinonoid series, from about 0.5 to 5 parts by weight per part of said compound of an acid-stable water-soluble inorganic salt and from about 0.5 to 2 parts by weight per part of said compound of a strong normally liquid non-reactive acid having a concentration ranging from about 68 to 100%, and drowning the resulting milled mixture in water.

2. The process of claim 1 in which the acid is sulfuric acid.

3. The process of claim 1 in which the salt is selected from the group consisting of alkali metal sulfates, acid sulfates, phosphates and acid phosphates.

4. The process of claim 1 in which the vattable compound is Indanthrene Blue RS, the salt is sodium sulfate and the acid is sulfuric acid.

5. The process of claim 1 in which the vattable compound is Indanthrene Brilliant Green B, the salt is sodium sulfate and the acid is sulfuric acid.

6. The process of claim 1 in which the vattable compound is dichloroanthanthrone, the salt is sodium sulfate and the acid is sulfuric acid.

7. A process comprising milling with forces predominantly shearing in nature a mixture in the form of a doughy kneadable mass consisting essentially of a water-insoluble vattable organic compound selected from the group consisting of vat dyestuffs of the indigoid and quinonoid series, from about 0.5 to 5 parts by weight per part of said compound of an acid-stable water-soluble inorganic salt and from about 0.5 to 2 parts by weight per part of said compound of a strong normally liquid non-reactive acid selected from the group consisting of sulfuric, chloroacetic, phosphoric, chlorosulfonic and lower alkyl sulfonic acids having a concentration ranging from about 68 to 100%, and drowning the resulting milled mixture in water.

8. The process of claim 7 in which the salt is selected from the group consisting of alkali metal sulfates, acid sulfates, phosphates and acid phosphates.

9. The process of claim 1 in which the salt is sodium sulfate.

10. The process of claim 7 in which the salt is sodium sulfate.

11. The process of claim 10 in which the acid is sulfuric acid.

References Cited in the file of this patent

UNITED STATES PATENTS

| | | |
|---|---|---|
| 1,145,934 | Steindorff et al. | July 13, 1915 |
| 2,613,128 | Baumann | Oct. 7, 1952 |
| 2,613,129 | McCormack | Oct. 7, 1952 |

OTHER REFERENCES

Fiat Final Report No. 1313, vol. III, page 297.